(12) United States Patent
Navalpakkam et al.

(10) Patent No.: US 12,468,850 B2
(45) Date of Patent: Nov. 11, 2025

(54) DIFFERENTIALLY PRIVATE HEATMAPS

(71) Applicant: Google LLC, Mountain View, CA (US)

(72) Inventors: Vidhya Navalpakkam, Mountain View, CA (US); Pasin Manurangsi, Mountain View, CA (US); Nachiappan Valliappan, Mountain View, CA (US); Kai Kohlhoff, Mountain View, CA (US); Junfeng He, Mountain View, CA (US); Badih Ghazi, Mountain View, CA (US); Shanmugasundaram Ravikumar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 419 days.

(21) Appl. No.: 17/863,186

(22) Filed: Jul. 12, 2022

(65) Prior Publication Data

US 2023/0032705 A1   Feb. 2, 2023

Related U.S. Application Data

(60) Provisional application No. 63/221,774, filed on Jul. 14, 2021.

(51) Int. Cl.
*G06F 21/62* (2013.01)
(52) U.S. Cl.
CPC .............................. *G06F 21/6254* (2013.01)
(58) Field of Classification Search
None
See application file for complete search history.

(56) References Cited

U.S. PATENT DOCUMENTS

| 2014/0176597 | A1* | 6/2014 | Cardno | G07F 17/3255 345/611 |
|---|---|---|---|---|
| 2017/0108923 | A1* | 4/2017 | Hurter | G06F 3/013 |
| 2021/0133590 | A1* | 5/2021 | Amroabadi | G06N 3/04 |
| 2021/0390188 | A1* | 12/2021 | Mireshghallah | G06F 21/6245 |
| 2023/0104945 | A1* | 4/2023 | Mao | G06T 7/0012 382/128 |
| 2023/0116638 | A1* | 4/2023 | Martínez | G06T 7/277 382/103 |

OTHER PUBLICATIONS

Abadi et al., "Deep Learning with differential privacy", CCS, pp. 308-318, 2016.

(Continued)

*Primary Examiner* — Dawaune A Conyers
(74) *Attorney, Agent, or Firm* — McDonnell Boehnen Hulbert & Berghoff LLP

(57) ABSTRACT

Improved methods are provided for generating heatmaps or other summary map data from multiple users' data (e.g., probability distributions) in a manner that preserves the privacy of the users' data while also generating heatmaps that are visually similar to the 'true' heatmap. These methods include decomposing the average of the users' data (the 'true' heatmap) into multiple different spatial scales, injecting random noise into the data at the multiple different spatial scales, and then reconstructing the privacy-preserving heatmap based on the noisy multi-scale representations. The magnitude of the noise injected at each spatial scale is selected to ensure preservation of privacy while also resulting in heatmaps that are visually similar to the 'true' heatmap.

19 Claims, 5 Drawing Sheets

(56) References Cited

OTHER PUBLICATIONS

Apple Differential Privacy Team. Learning with privacy at scale. Apple Machine Learning Journal, 2017.
Balle et al., "Private summation in the multi-message shuffle model", CCS, pp. 657-676, 2020.
Balcan et al., "Differentially private clustering in high-dimensional Euclidean spaces", ICML, pp. 322-331, 2017.
Blum et al., "Practical privacy: the SuLQ framework", PODS, pp. 128-138, 2005.
Berinde et al., "Combining geometry and combinatorics: A unified approach to sparse signal recovery", Allerton, pp. 798-805, 2008.
Berinde et al., "Sequential sparse matching pursuit", Allerton, pp. 36-43, 2009.
Berinde et al., "Practical near-optimal sparse recovery in the L1 norm", Allerton, pp. 198-205, 2008.
Backurs et al., "Nearly-optimal bounds for sparse recovery in generic norms, with applications to k-median sketching", SODA, pp. 318-337, 2016.
Bylinskii et al., "What do different evaluation metrics tell US about saliency models?", IEEE Trans. Pattern Anal. Mach. Intell., 41(3):740-757, 2019.
Chang et al., "Locally private k-means in one round", ICML, 2021.
Moses Charikar, "Similarity estimation techniques from rounding algorithms", STOC, pp. 380-388, 2002.
Canonne et al., "The discrete gaussian for differential privacy", NeurIPS, 2020.
Chaturvedi et al., "Differentially private k-means clustering via exponential mechanism and max cover", AAAI, 2021.
Cormode et al., "Differentially private summaries for sparse data", ICDT, pp. 299-311, 2012.
Dwork et al., "Our data, ourselves: Privacy via distributed noise generation", EUROCRYPT, pp. 486-503, 2006.
Ding et al., "Collecting telemetry data privately", NeurIPS, pp. 3571-3580, 2017.
Dwork et al., "Calibrating noise to sensitivity in private data analysis", TCC, pp. 265-284, 2006.
Dwork et al., "Robust traceability from trace amounts", In Venkatesan Guruswami, editor, FOCS, pp. 650-669, 2015.
Erlingsson et al., "RAPPOR: Randomized aggregatable privacy-preserving ordinal response", CCS, pp. 1054-1067, 2014.
Feldman et al., "Private coresets", STOC, pp. 361-370, 2009.
Feldman et al., "Coresets for differentially private k-means clustering and aplications to privacy in mobile sensor networks", IPSN, pp. 3-16, 2017.
Grauman et al., "Fast contour matching using approximate earth mover's distance", CVPR, pp. 220-227, 2004.
Ghazi et al., "Differentially private clustering: Tight approximation ratios", NeurIPS, 2020.
Gupta et al., "Differentially private combinatorial optimization", SODA, pp. 1106-1125, 2010.
Ghazi et al., "Private aggregation from fewer anonymous messages", Eurocrypt, pp. 798-827, 2020.
Andy Greenberg, "Apple's "differential privacy" is about collecting your data—but not your data", Wired, Jun. 13, 2016.
Huang et al., "Optimal differentially private algorithms for k-means clustering", PODS, pp. 395-408, 2018.
Har-Peled et al., "On coresets for k-means and k-median clustering", STOC, pp. 291-300, 2003.
Hardt et al., "On the geometry of differential privacy", STOC, pp. 705-714, 2010.
Isaacman et al., "Human mobility modeling at metropolitan scales", MobiSys, pp. 239-252, 2012.
Indyk et al., "k-median clustering, model-based compressive sensing, and sparse recovery for earth mover distance", STOC, pp. 627-636, 2011.
Indyk et al., "Near-optimal sparse recovery in the L1 norm", FOCS, pp. 199-207, 2008.
Indyk et al., "Fast image retrieval via embeddings", Workshop on Statistical and Computational Theories of Vision, 2003.
Jones et al., "Differentially private clustering via maximum coverage", AAAI, 2021.
Kasiviswanathan et al., "What can we learn privately?", FOCS, pp. 531-540, 2008.
Kranstauber et al., "Similarity in spatial utilization distributions measured by the earth mover's distance", Methods in Ecology and Evolution, 8(2):155-160, 2017.
Levina et al., "The earch mover's distance is the Mallows distance: some insights from statistics", In ICCV, pp. 251-256, 2001.
Liu et al., "Private selection from private candidates", In Moses Charikar and Edith Cohen, STOC, pp. 298-309, 2019.
Liu et al., "Differential privacy for eye-tracking data", In ETRA, pp. 1-10, 2019.
Mohan et al., "GUPT: privacy preserving data analysis made easy", In SIGMOD, pp. 349-360, 2012.
Nock et al., "k-variates++: more pluses in the k-means++", In ICML, pp. 145-154, 2016.
Nissim et al., "Smooth sensitivity and sampling in private data analysis", In STOC, pp. 75-84, 2007.
Nissim et al., "Clustering algorithms for the centralized and local models", In ALT, pp. 619-653, 2018.
Nissim et al., "Locating a small cluster privately", In PODS, pp. 413-427, 2016.
Puzicha et al., "Empirical evaluation of dissimilarity measures for color and texture", In ICCV, pp. 1165-1173, 1999.
Radebaugh et al., "Introducing Tensorlow Privacy: Learning with Differential Privacy for Training Data", Mar. 2019, blog.tensorflow.org.
Rubner et al., "A metric for distributions with applications to image databases", In ICCV, pp. 59-66, 1998.
Rubner et al., "The earth mover's distance as a metric for image retrieval", IGCV, 40(2):99-121, 2000.
Su et al., "Differentially private k-means clustering", In CODASPY, pp. 26-37, 2016.
Stephen Shankland, "How Google tricks itself to protect Chrome user privacy", CNET, Oct. 2014.
Steil et al., "Privacy-aware eye tracking using differential privacy", In ETRA, pp. 1-9, 2019.
Stemmer et al., "Differentially private k-means with constant multiplicative error", In NeurIPS, pp. 5436-5446, 2018.
Stricker et al., "Similarity of color images", In SPIE, pp. 381-392, 1995.
Uri Stemmer, "Locally private k-means clustering", In SODA, pp. 548-559, 2020.
Testuggine et al., "PyTorch Differential Privacy Series Part 1: DP-SGD Algorithm Explained", Aug. 2020.
Wang et al., "Supervised earth mover's distance learning and its computer vision applications", In ECCV, pp. 442-455, 2012.
Wang et al., "Differentially private subspace clustering", In NeurIPS, pp. 1000-1008, 2015.
Zhao et al., "Differential earth mover's distance with its applications to visual tracking", PAMI, 32:274-287, 2008.
Jiang et al., "SALICON: Saliency in Context", In CVPR, 1072-1080, 2020.
Canonne et al., "The discrete Gaussian for differential privacy", In NeurIPS, 2020.

\* cited by examiner

DIFFERENTIALLY PRIVATE HEATMAPS

CROSS-REFERENCE TO RELATED APPLICATIONS

The present application is a non-provisional patent application claiming priority to U.S. Provisional Patent Application No. 63/221,774, filed Jul. 14, 2021, the contents of which are hereby incorporated by reference.

BACKGROUND

It is beneficial in a variety of applications to generate "heatmaps" or similar summary information about the distribution of something of interest (e.g., users) across as two (or more) dimensional space. For example, a heatmap indicating the most likely locations of attendees within an amusement park could be used to determine where to locate drinking fountains or other facilities, where to allocate maintenance or upgrade efforts, etc. In another example, a heatmap indicating where a user looked at a user interface (e.g., determined vua 'gaze detection') could be used to determine which portions of the interface were most useful and/or had the greatest impact on a user's perception. Regardless of the application, such heatmaps are often generated based on private data (e.g., user location data, gaze tracking data). Accordingly, it is necessary to generate heatmaps from such data in a manner that preserves the privacy of the users whose data is used.

SUMMARY

According to a first aspect of the present disclosure, there is provided a computer-implemented method including: (i) receiving an input distribution that is an average of a number of individual distributions, each individual distribution representing data from a respective different entity; (ii) using a multi-scale spatial transform, transforming the input distribution into a multi-scale representation that includes two or more representations of the input distribution at respective different spatial scales; (iii) adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales; (iv) based on the anonymized multi-scale representation, reconstructing an output distribution such that the output distribution, when transformed using the multi-scale spatial transform, results in an approximation of the anonymized multi-scale representation.

According to a second aspect of the present disclosure, there is provided a computer-implemented method including: (i) receiving an input distribution that is an average of a number of individual distributions, each individual distribution representing data from a respective different entity; (ii) using a multi-scale spatial transform, transforming the input distribution into a multi-scale representation that includes two or more representations of the input distribution at respective different spatial scales; (iii) adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales; (iv) sparsifying the anonymized multi-scale representation such that no more than a specified number of elements of any of the two or more representations of the input distribution at respective different spatial scales are non-zero; and (v) based on the sparsified anonymized multi-scale representation, reconstructing an output distribution such that the output distribution, when transformed using the multi-scale spatial transform, results in an approximation of the sparsified anonymized multi-scale representation.

According to a third aspect of the present disclosure, a computing device is provided that includes one or more processors, wherein the one or more processors are configured to perform the method of either of the first or second aspects above.

According to a fourth aspect of the present disclosure, an article of manufacture including a non-transitory computer-readable medium is provided, having stored thereon program instructions that, upon execution by a computing device, cause the computing device to perform operations to effect the method of either of the first or second aspects above.

DETAILED DESCRIPTION

Figure 1:
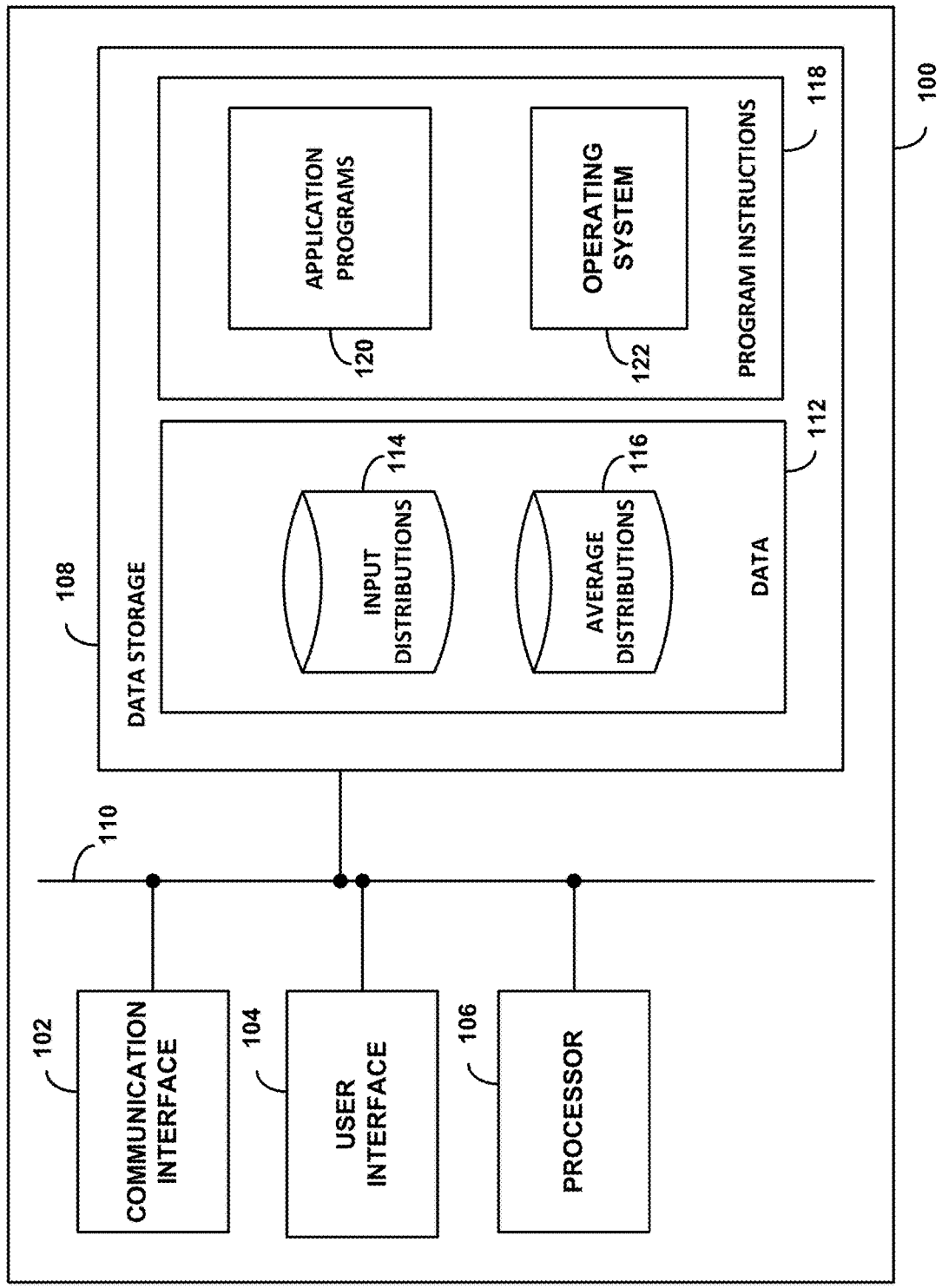
FIG. 1 illustrates aspects of an example system.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

It is desirable in a variety of contexts to provide "heat maps" of the level of activity or some other factor of interest across a two-dimensional area (or other-dimensional space). For example, it can be desirable to provide a heat map that shows where people, devices, or other entities are likely to go within a store or other space based on GPS tracks and/or location check-ins from individual people or other individual entities. In another example, it can be desirable to provide a heat map that shows where viewers are likely to look at a display or other target of interest based on detected eye gaze data. In another example, it can be desirable to provide a heatmap to show where viewers are likely to look at/interact with a user interface based on cursor track, button press locations, or other information. Heatmaps could be generated for gene microdata (e.g., to illustrate the distribution of different genotypes) based on gene sequences or allele vectors for individual people. However, because such heat maps are often generated based on private data aggregated from many users, devices, or other entities, it is necessary to "anonymize" the heat maps such that the private data of any individual entity, or specified group of entities, cannot be recovered, even in scenarios where the heat maps may be generated based on queries generated by users, devices, or other entities.

The methods described herein can be used to generate such heatmaps (or to generate distributions that can then be smoothed, upsampled, or otherwise processed to generated such heatmaps) in a manner that mathematically provably preserves the privacy of the individuals' source data. These methods also provide distributions that "look" correct, since the methods generate anonymized output distributions that approximate the non-anonymized input distributions with respect to the "earth mover's distance" (EMD) between the input and output distributions while still ensuring that the output distribution cannot be used to recover the private source data used to generate the input distribution.

These benefits are achieved by transforming the input distribution into a multi-scale representation (e.g., by applying a pyramidal transform) and then adding noise to the multi-scale representation in a manner that is dependent upon spatial scale. So, for example, aspects of the multi-scale representation that represent the input distribution at a low spatial scale will have lower-magnitude noise (e.g., lower-variance Laplacian-distributed noise) added thereto than aspects of the multi-scale representation that represent the input distribution at a higher spatial scale, which will have added thereto higher-magnitude noise (e.g., higher-variance Laplacian-distributed noise). The noisy multi-scale representation can then be used to reconstruct an output distribution by attempting to generate an output distribution (e.g., using linear programming, gradient descent, etc.) that, when transformed into the multi-scale representation, approximates the noisy multi-scale representation (e.g., with respect to $\ell 1$ distance between the representations) according to the EMD, thus appearing perceptually similar to the non-anonymized input distribution while preventing private data (e.g., individual location check-in distributions) from being determined therefrom.

This method can be made more efficient and/or computationally tractable with respect to compute cycles and memory use by "sparsifying" the noisy multi-scale representation prior to reconstruction. This "sparsification" process includes removing low-value elements of the noisy multi-scale representation at each spatial scale. For example, removing low-value elements from each spatial scale of the noisy multi-scale representation such that no more than a maximum number of elements remain non-zero in each spatial scale of the noisy multi-scale representation following the sparsification. This allows the subsequent reconstruction process to operate on significantly fewer non-zero elements, thereby reducing the cycle cost and memory footprint of the reconstruction.

With respect to embodiments that include receiving private entity data (e.g., data that is private to a specific user, a specific user in a specific session, a specific device, or some other specific entity) in order to generate heatmaps (e.g., by taking the mean of such data and then adding noise thereto so as to anonymize the mean), interactions by an entity's computing device with cloud-based servers, or otherwise involving sharing captured information (e.g., GPS tracks) with other computing devices, an entity may be provided with controls allowing the entity to make an election as to both if and when systems, programs, or features described herein may enable collection of entity information (e.g., information about an entity's location, gaze direction, interaction with user interface elements), and if the entity is sent content or communications from a server. In addition, certain data may be treated in one or more ways before it is stored or used, so that personally identifiable information is removed. For example, an entity's identity may be treated so that no personally identifiable information can be determined for the entity, or an entity's geographic location may be generalized where location information is obtained (such as to a city, ZIP code, or state level), so that a particular location of an entity cannot be determined. Thus, the entity may have control over what information is collected about the entity, how that information is used, and what information is provided to the entity.

II. Illustrative Systems

FIG. 1 illustrates an example computing device 100 that may be used to implement the methods described herein. By way of example and without limitation, computing device 100 may be a cellular mobile telephone (e.g., a smartphone), a computer (such as a desktop, notebook, tablet, or handheld computer, a server), elements of a cloud computing system, a robot, a drone, an autonomous vehicle, or some other type of device. It should be understood that computing device 100 may represent a physical computing device such as a server, a particular physical hardware platform on which a machine learning application operates in software, or other combinations of hardware and software that are configured to carry out machine learning functions as described herein.

As shown in FIG. 1, computing device 100 may include a communication interface 102, a user interface 104, a processor 106, and data storage 108, all of which may be communicatively linked together by a system bus, network, or other connection mechanism 110.

Communication interface 102 may function to allow computing device 100 to communicate, using analog or digital modulation of electric, magnetic, electromagnetic, optical, or other signals, with other devices, access networks, and/or transport networks. Thus, communication interface 102 may facilitate circuit-switched and/or packet-switched communication, such as plain old telephone service (POTS) communication and/or Internet protocol (IP) or other packetized communication. For instance, communication interface 102 may include a chipset and antenna arranged for wireless communication with a radio access network or an access point. Also, communication interface 102 may take the form of or include a wireline interface, such as an Ethernet, Universal Serial Bus (USB), or High-Definition Multimedia Interface (HDMI) port. Communication interface 102 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 102. Furthermore, communication interface 102 may comprise multiple physical communication interfaces (e.g., a Wifi interface, a BLUETOOTH® interface, and a wide-area wireless interface).

In some embodiments, communication interface 102 may function to allow computing device 100 to communicate, with other devices, remote servers, access networks, and/or transport networks. For example, the communication interface 102 may function to access one or more privacy-preserving algorithms as described herein for generating heatmaps or distributions from entity data (e.g., location tracks, location check-ins, gaze tracks, cursor tracks) and/or input therefor via communication with a remote server or other remote device or system in order to allow the computing device 100 to use the algorithms to generate outputs (e.g., anonymized heatmaps or distributions) based on input data.

User interface 104 may function to allow computing device 100 to interact with a user or other entity, for example to receive input from and/or to provide output to the user. Thus, user interface 104 may include input components such as a keypad, keyboard, touch-sensitive or presence-sensitive panel, computer mouse, trackball, joystick, microphone, and so on. User interface 104 may also include one or more output components such as a display screen which, for example, may be combined with a presence-sensitive panel. The display screen may be based on CRT, LCD, and/or LED technologies, or other technologies now known or later developed. User interface 104 may also be configured to generate audible output(s), via a speaker, speaker jack, audio output port, audio output device, earphones, and/or other similar devices.

Processor 106 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, merging images, transforming images, or reconstructing distribution, among other applications or functions. Data storage 108 may include one or more volatile and/or non-volatile storage components, such as magnetic, optical, flash, or organic storage, and may be integrated in whole or in part with processor 106. Data storage 108 may include removable and/or non-removable components.

Processor 106 may be capable of executing program instructions 118 (e.g., compiled or non-compiled program logic and/or machine code) stored in data storage 108 to carry out the various functions described herein. Therefore, data storage 108 may include a non-transitory computer-readable medium, having stored thereon program instructions that, upon execution by computing device 100, cause computing device 100 to carry out any of the methods, processes, or functions disclosed in this specification and/or the accompanying drawings. The execution of program instructions 118 by processor 106 may result in processor 106 using data 112.

By way of example, program instructions 118 may include an operating system 122 (e.g., an operating system kernel, device driver(s), and/or other modules) and one or more application programs 120 (e.g., functions for executing heatmap generation algorithms) installed on computing device 100. Data 112 may include input distributions 114 and/or average distributions determined therefrom 116.

Application programs 120 may communicate with operating system 122 through one or more application programming interfaces (APIs). These APIs may facilitate, for instance, application programs 120 transmitting or receiving information via communication interface 102, receiving and/or displaying information on user interface 104, and so on.

Application programs 120 may take the form of "apps" that could be downloadable to computing device 100 through one or more online application stores or application markets (via, e.g., the communication interface 102). However, application programs can also be installed on computing device 100 in other ways, such as via a web browser or through a physical interface (e.g., a USB port) of the computing device 100.

III. Example Methods

Figure 2:
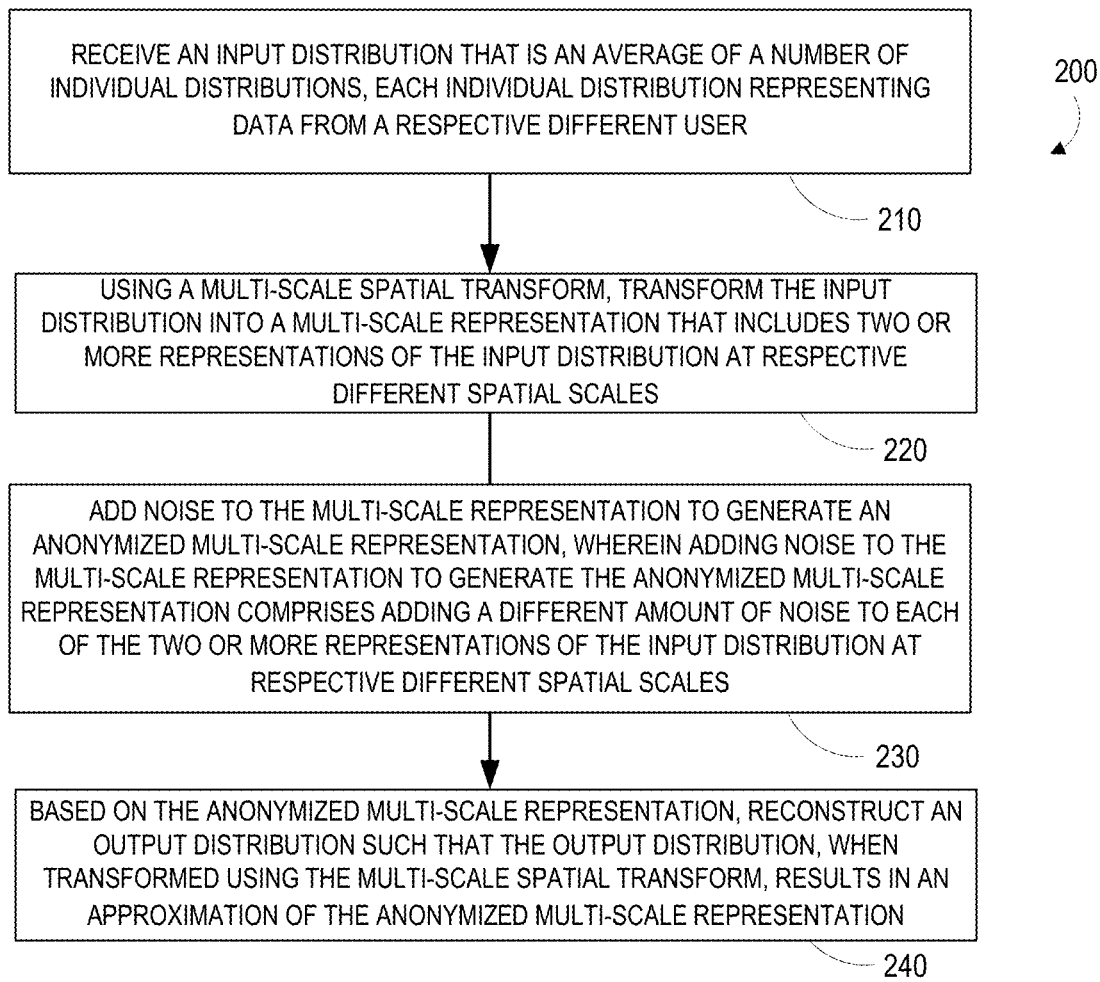
FIG. 2 illustrates a flowchart of an example method.

FIG. 2 is a flowchart of a computationally efficient and tractable method 200 for generating heatmaps or related distributions from input distributions in a manner that preserves the privacy of the input distributions. The method 200 includes receiving an input distribution that is an average of a number of individual distributions, each individual distribution representing data from a respective different entity (210). The method 200 additionally includes, using a multi-scale spatial transform, transforming the input distribution into a multi-scale representation that includes two or more representations of the input distribution at respective different spatial scales (220). The method 200 additionally includes adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales (230). The method 200 additionally includes, based on the anonymized multi-scale representation, reconstructing an output distribution such that the output distribution, when transformed using the multi-scale spatial transform, results in an approximation of the anonymized multi-scale representation (240). The method 200 could include additional or alternative features.

Figure 3:
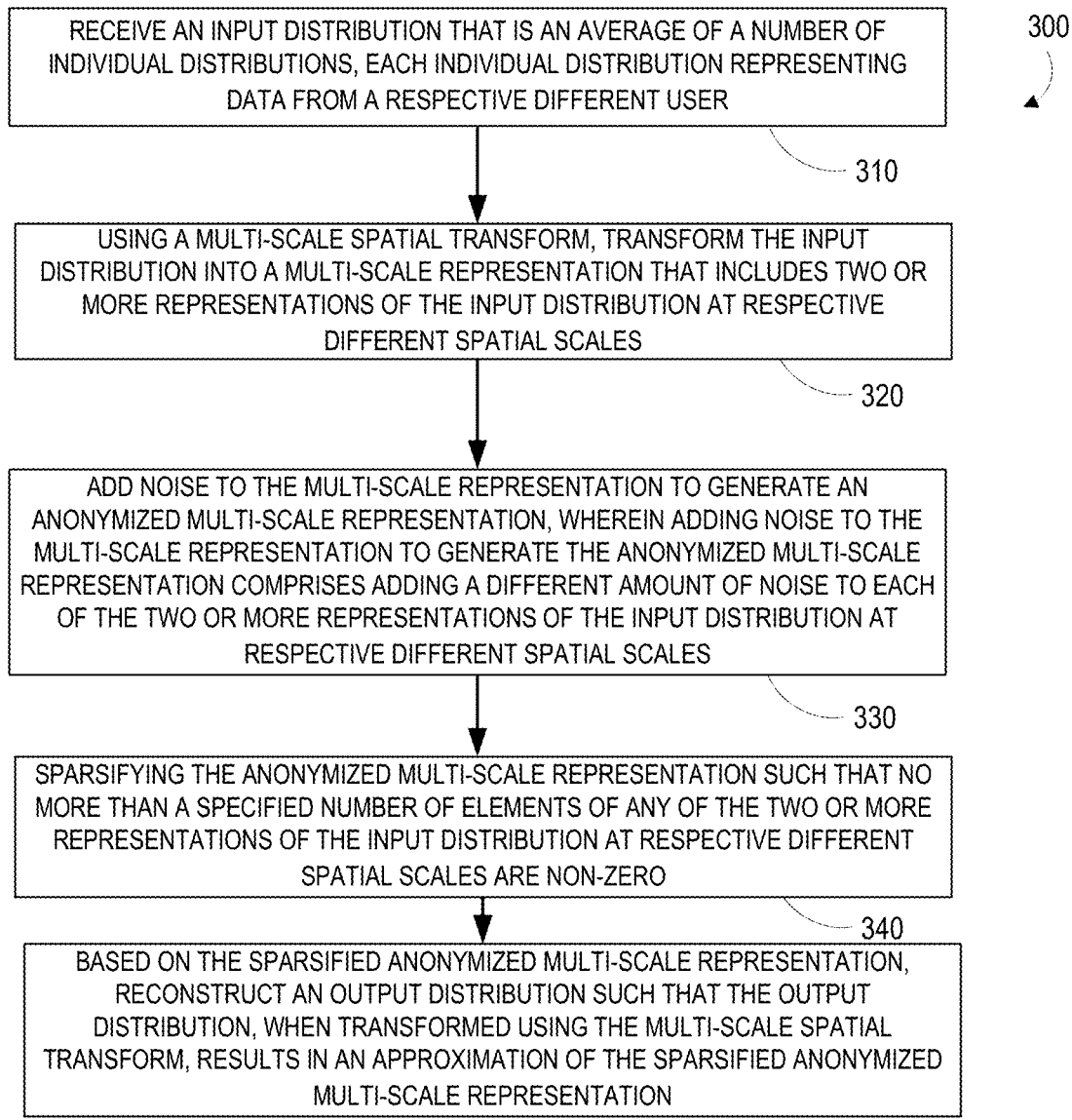
FIG. 3 illustrates a flowchart of an example method.

FIG. 3 is a flowchart of a computationally efficient and tractable method 300 for generating heatmaps or related distributions from input distributions in a manner that preserves the privacy of the input distributions. The method 300 includes receiving an input distribution that is an average of a number of individual distributions, each individual distribution representing data from a respective different entity (310). The method 300 additionally includes, using a multi-scale spatial transform, transforming the input distribution into a multi-scale representation that includes two or more representations of the input distribution at respective different spatial scales (320). The method 300 additionally includes adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales (330). The method 300 additionally includes sparsifying the anonymized multi-scale representation such that no more than a specified number of elements of any of the two or more representations of the input distribution at respective different spatial scales are non-zero (340). The method 300 also includes, based on the sparsified anonymized multi-scale representation, reconstructing an output distribution such that the output distribution, when transformed using the multi-scale spatial transform, results in an approximation of the sparsified anonymized multi-scale representation (350). The method 300 could include additional or alternative features.

IV. Example Embodiments

Differential privacy (DP) provides a strong definition of user privacy for data aggregation and machine learning, with practical deployments including the 2022 US Census, in industry, and in popular machine learning libraries. DP algorithms have been developed for several analytic tasks involving aggregation of user data.

One of the basic data aggregation tools is a heatmap. Heatmaps are popular for visualizing aggregated data in two or higher dimensions. They can be used in a variety of applications, e.g., in computer vision and image processing, spatial data analysis, bioinformatics. Many of these applications involve protecting the privacy of user data. For example, a heatmap of popular locations in a geographic area can be determined based on user location check-ins, which represent sensitive private data. In another example, heatmaps for gene microdata or gaze can be determined based on private data from individuals.

The systems and methods described herein provide an efficient, differentially private algorithm for computing heatmaps with provable privacy guarantees. Also provided are empirical evaluations of the privacy of these methods.

Some of the systems and methods described herein provide a "primitive" for solving the task of privately aggregating sparse input vectors with a small error as measured by the Earth Mover's Distance (EMD). While often used in relation to heatmaps, the EMD measure is of independent interest: it was originally proposed for computer vision tasks since it matches perceptual similarity better than other measures such as $\ell 1$, $\ell 2$, or Kullbeck-Liebler (KL) divergence. It is also well-suited for spatial data analysis since it can take an underlying metric space into account and can be sensitive to "neighboring" bins. For the task of sparse aggregation under EMD, the embodiments described herein provide an efficient algorithm with asymptotically tight error.

To illustrate the systems and methods provided herein, consider the setting where each user i holds a probability distribution $p_i$ over grid points in $[0; 1)^2$, and the goal is to compute the heatmap of the average of these probabilities, i.e.

$$, \frac{1}{n}\sum_{i=1}^{n} p_i.$$

An ε-DP algorithm is provided for this task, its theoretical guarantees are established, and empirical evaluations of its performance are provided herein.

Generally, the embodiments described herein apply methods for sparsely aggregating the probability distributions under the EMD. In particular, it is desirable to generate an estimate for $$\frac{1}{n}\sum_{i=1}^{n} p_i$$

with error measured in the EMD. EMD is used for the error measure for at least two primary reasons. First, a bound on the EMD to the average distribution implies bounds on several metrics commonly used in evaluating heatmaps, including the KL-divergence, $\ell 1$ distance, and EMD itself. Second, while it is possible to obtain DP aggregation algorithms with bounded EMD error, any DP aggregation algorithm must suffer errors under other metrics, including KL-divergence or $\ell 1$ distance, that grow with the resolution, rendering them impractical in the setting where the number of users is small compared to the resolution.

When the distributions' $p_i$'s are arbitrary, a simple ε-DP algorithm yields a guarantee of $O_\varepsilon(1/\sqrt{n})$ on EMD, and this bound is essentially optimal. While this is already a reasonable bound, the methods described herein improve on it by exploiting a property that is commonly present in distributions used for aggregations: they tend to be "sparse".

The approximation guarantee for the sparse EMD aggregation problem is defined herein with respect to the best k-sparse distribution that approximates the average $$a := \frac{1}{n}\sum_{i=1}^{n} p_i$$

under EMD. More formally, an output distribution â is by definition a "($\lambda$, $\kappa$)-approximation" for sparse EMD aggregation if it satisfies $$EMD(\hat{a}, a) \le \lambda \cdot \min_{k-sparse a'} EMD(a', a) + \kappa, \text{ where } \lambda, \kappa > 0$$

denote the multiplicative approximation ratio and additive error respectively and a' is any k-sparse distribution (e.g., the k-sparse distribution that minimizes EMD(a', a)).

Under such a sparse approximation notion, an error of only $O_\varepsilon(\sqrt{k}/n)$ is achievable, and this error is tight.

Theorem 1.1 (Informal): There exists an ε-DP algorithm that, for any constant $\lambda \in (0,1)$, can output a ($\lambda$, $O_\varepsilon(\sqrt{k}/n)$)-approximation for sparse EMD aggregation with probability 0.99. Furthermore, no ε-DP algorithm can output a ($\lambda$, $o_\varepsilon(\sqrt{k}/n)$)-approximate solution with probability 0.1.

This result has implications on DP Clustering. Sparse EMD aggregation is intimately related to clustering—for example, the k-median problem—on the plane. Indeed, an algorithm for sparse EMD aggregation implies a coreset for k-median on the plane, which in turn can be used to derive an approximation algorithm for the problem. Accordingly, the following are implied:

Corollary 1.2. There exists an ε-DP algorithm that, for any constant (0,1), can output a ($\lambda$,$O(\sqrt{k}/\varepsilon)$)-coreset for k-median, where each input point belongs to $[0,1)^2$.

Corollary 1.3. There exists an ε-DP algorithm that, for any constant $\lambda \in (0,1)$, can output a $(1+\lambda,O(\sqrt{k}/\varepsilon))$-approximation for k-median, where each input point belongs to $[0,1)^2$.

Prior attempts have incurred an additive error of $\Omega(k)$, while results for the methods described herein achieve an improved $O(\sqrt{k})$ additive error; this bound is also tight due to an adaptation of the lower bound for k-sparse distribution aggregation used herein. This additive error is also independent of the number n, of users, a significant benefit. Prior attempts incurred an additive error that depended on the number n of users.

The methods described herein were tested on both real-world location datasets and synthetic datasets. The results demonstrate practicality even for moderate values of c E [0.5,5] and a number of users equal to 200. The methods described herein were also compared with simple baselines. When applying popular metrics for heatmaps, the results for the methods described herein demonstrate significant improvements on these regimes of parameters.

Some implementations of the methods described herein are related to determining an underlying vector x that is known to be well-approximated by a sparse vector; a matrix A can be provided such that, when measurements Ax are observed of x, an x' can be reconstructed that is close to x (under a certain metric). This can be accomplished trivially by taking A to, e.g., be the identity matrix. Thus, the objective is to perform this recovery task using as few measurements (i.e., number of rows of A) as possible.

Such a "compressed sensing" under EMD can be reduced to a problem under $\ell 1$. Such a reduction can include finding a linear transformation that satisfies certain properties. Once such a transformation is specified, the algorithm can proceed (roughly) as follows: transform the input x, run the compressed sensing scheme for $\ell 1$, and then "reverse" the transformation to get x'. Note that the number of measurements required for such a solution 0 is that of the $\ell$ compressed sensing scheme.

One can apply such a method to DP aggregation by viewing the hidden vector x as the sum $\Sigma_{i=1}{}^n p_i$, and then add Laplacian noise to each measurement to ensure privacy. The robustness of known $\ell 1$ compressed schemes can be applied to analyze the error of such a method; unfortunately, since the error will scale according to the $\ell 1$ norm of the noise vector and the noise vector consists of $O(k \cdot \log(n/k))$ entries, this approach only provides an error guarantee of $O(k \cdot \text{poly} \log n)$.

To overcome this limitation barrier, a difference between the goals of compressed sensing and DP aggregation can be leveraged, namely, that the former aims to minimize the number of measurements whereas the latter aims to minimize the error due to the noise added (irrespective of the number of measurements). Thus, methods from compresses sensing can be applied without compressing, e.g., measuring the entire transformation. The log n error of such modified method can be further reduced by selecting a different noise magnitude for each measurement, which allows for the $O(\sqrt{k})$ error noted above to be obtained.

Determination of the lower bound follows a packing framework. Specifically, a set of k-sparse distributions was generated whose pairwise EMDs are at least $\Omega(1/\sqrt{k})$. This construction is based on an $\ell 1$ packing of the $\sqrt{k} \times \sqrt{k}$ grid, which gives a set of size $2^{\Omega(k)}$. It then follows that the error is at least $\Omega_\varepsilon(\sqrt{k}/n)$ with probability 0.9.

Notational Definitions

For every non-negative integer $N \in \mathbb{N} \cup \{0\}$, [N] is written to denote $\{0, \ldots, N\}$. Let $G_\Delta$ be the set of $(\Delta \times \Delta)$ grid points in $[0,1)^2$; specifically, $G_\Delta = \{(i/\Delta, j/\Delta) | i,j \in [\Delta-1]\}$. For notational convenience, it is assumed throughout that $\Delta = 2^\ell$ for some $\ell \in \mathbb{N}$.

For an index set I, $p \in \mathbb{R}^I$ is viewed as a vector indexed by I and p(i) is written to denote the value of its $i^{th}$ coordinate; this notation extends naturally to the set $S \subseteq I$ of coordinates, for which we let $p(S) := \Sigma_{i \in I} p(i)$. Furthermore, p|s is used to denote the restriction of p to S; more formally p|s(i)=p(i) if $i \in S$ and p|s(i)=0 otherwise. Additionally, $p|_{\bar{S}}$ is written as a shorthand for p–p|s, i.e., the restriction of p to the complement of S. supp(p) is used to denote the set of non-zero coordinates of vector p. A vector is said to be k-sparse if its support is of size at most k. Recall that the $\ell 1$-norm of a vector $p \in \mathbb{R}^I$ is $\|p\|_1 := \Sigma_{i \in I} |p(i)|$.

Given two non-negative vectors p, $q \in \mathbb{R}_{\geq 0}^{G_\Delta}$ such that $\|p\|_1 = \|q\|_1$, their earth mover's distance (EMD) is defined as $$EMD(p, q) = \min_\gamma \sum_{x \in G_\Delta} \sum_{y \in G_\Delta} \gamma(x, y) \cdot \|x - y\|_1.$$

Here, the minimum is over $\gamma \in \mathbb{R}_{\geq 0}^{G_\Delta \times G_\Delta}$ whose marginals are p and q. (More formally, for all $x \in G_\Delta, \Sigma_{y \in G_\Delta} \gamma(x, y) = p(')$ and, for all $y \in G_\Delta$, $\Sigma_{x \in G_\Delta} \gamma(x, y) = q(y)$.

The EMD norm of a vector $w \in \mathbb{R}^{G_\Delta}$ is defined by $$\|w\|_{EMD} := \min_{\substack{p,q \in \mathbb{R}_{\geq 0}^{G_\Delta} \\ p-q+rw, \|p\|_1 = \|q\|_1}} EMD(p, q) + a \cdot \|r\|, \text{ where } \alpha = 2$$

is the diameter of our space $[0,1) \times [0,1)$.

The following lemma is useful when dealing with unnormalized vs normalized vectors.

Lemma 2.1. Suppose that $s, \hat{s} \in \mathbb{R}_{\geq 0}^{Gis \Delta}$ are such that $\|s\|_1 = n$ and $\|s - \hat{s}\|_{EMD} \leq n/2$. Let $a = s/\|s\|_1$ and $\hat{a} = \hat{s}/\|\hat{s}\|_1$. Then, $\|a - \hat{a}\|_{EMD} \geq 4\|s - \hat{s}\|_{EMD}/n$.

Two input datasets X and X' are said to be neighbors if X' results from adding or removing a single user's data from X. In the present setting, each user i s data is a probability distribution $p_i$ over $G_\Delta$.

Definition 2.1 (Differential Privacy). A mechanism M is said to be $\varepsilon$-DP if and only if, for every set O of outputs and every pair X,X' of neighboring datasets, $\Pr[M(X) \in O] \geq e^\varepsilon \cdot \Pr[M(X') \in O]$.

Definition 2.2 (Laplace Mechanism). For any vector-valued function $f$, its $\ell 1$-sensitivity, denoted by $S_1(f)$, is defined as $\max_{neighboring\ X,\ X'} \|f(X) - f(X')\|_1$. The Laplace mechanism with parameter $b > 0$ adds an independent noise drawn from the Laplace distribution Lap(b) to each coordinate of $f$.

Lemma 2.2. The Laplace mechanism with parameter $S_1(f)/\varepsilon$ is $\varepsilon$-DP.

Given $p \in \mathbb{R}_{\geq 0}^{G_\Delta}$, its associated heatmap with Gaussian filter variance $\sigma^2$ is defined as $$H_p^\sigma(x, y) = \sum_{(x',y') \in G_\Delta} \frac{1}{Z(x', y')} e^{-\frac{(x-x')^2 + (y-y')^2}{2\sigma^2}} \cdot p(x', y') \text{ for all}$$

$(x, y) \in G_\Delta$, where $Z(x', y') := \sum_{(x',y') \in G_\Delta^c} e^{-\frac{(x-x')^2+(y-y')^2}{2\sigma^2}}$ is the normalization factor.

In the heatmap aggregation problem over n users, each user i has a probability distribution $p_i$ over $G_\Delta$. The goal is to output an estimate of the aggregated heatmap $H_a{}^\sigma$ where $$a = \frac{1}{n} \sum_{i \in [n]} P_i.$$

Example Algorithm

In this section, an example implementation of a private, sparse EMD aggregation algorithm as described herein is described.

Theorem 3.1. For any $\varepsilon > 0$ and $\lambda \in (0,1)$, there is an $\varepsilon$-DP algorithm that can, with probability 0.99, output a $$\left(\lambda, O\left(\frac{\sqrt{k}}{\lambda \varepsilon n}\right)\right)$$

approximation for the k-sparse EMD aggregation problem.

As alluded to above, a linear transformation can be used. In particular, the so-called (scaled) pyramidal transform, whose variant is also often used in (metric) embedding of EMD to $\ell 1$, can be used as the linear transform. Roughly speaking, the transform represents a hierarchical partitioning of $[0,1)^2$ into subgrids, where a subgrid at a level is divided into four equal subgrids at the next level. The (scaled) pyramidal transform has one row corresponding to each subgrid; the row is equal to the indicator vector of the subgrid scaled by its side length. These are formalized below.

Definition 3.1 (Grid Cells). For $i \in \mathbb{N} \cup \{0\}$, let $C_{2^i}$ denote the set of level i grid cells defined as $C_{2^i}:=\{[a,a+2^{-i})\times[b,b+2^{-i})|(a, b)\in G_{2^i}\}$; let $m_i:=|C_{2^i}|$.

Definition 3.2 ((Scaled) Pyramidal Transform). For $i \in [\ell]$, the level-i grid partition map is defined as the matrix $P_i \in \{0,1\}^{C_{2^i} \times G_\Delta}$ where $P_i(c,p)=1$ if and only if $p \in c$. The (scaled) pyramidal transform is the matrix $P \in \mathbb{R}^{\sum_{i=0}^{\ell} C_{2^i} \times G_\Delta}$ defined by $P:=[P_0^{T} 2^{-1} P_1^T \cdots 2^{-\ell} P_\ell]^T$.

The example implementation of an algorithm for sparse EMD aggregation includes two components. The first component, presented in Algorithm 1 below, first aggregates the input distributions (Line 3) and applies the pyramidal transform to the aggregate, adding different amounts of Laplace noise for different levels of the grid (Lines 5, 6). (The parameters $\epsilon 1, \ldots, \epsilon \ell$, which govern the amount of added Laplace noise, will be specified in the next subsection.) The second component, presented in Algorithm 2 below, takes these noisy measurements for every level of the grid and reconstructs the solution by first recovering the $\ell_1$ solution (Line 8) and then the EMD solution using a linear program (Line 9).

These implementations provide at least the following two improvements: first, noise is added to the measurements and, secondly, there is no explicit "compression" performed, such compression taking a wide matrix A for for $\ell_1$ recovery and multiplies it with Ps.

Algorithm 1: DPSparseEMDAgg
  1: Input: distributions $p_1, \ldots, p_n$ on $G_\Delta$
  2: Parameters: $\epsilon_1, \ldots, \epsilon \ell > 0$, $w \in \mathbb{N}$
  3: $s \leftarrow \sum_{i=1}^n p_i$
  4: for $i = 0, \ldots, \ell$ do
  5: $v_i \leftarrow \text{Lap}(1/\epsilon_i)^{\otimes m_i}$
  6:

$$y'_i \leftarrow \frac{1}{2^i}(P_i s + v_i)$$

7: end for
  8: $y' \leftarrow [y'_0 \ldots y'_\ell]$
  9: $\hat{s} \leftarrow \text{Reconstruct}(y'; w)$
  10: return $\hat{a} := \hat{s}/\|\hat{s}\|$ Algorithm 2: Reconstruct
  1: Input: noisy measurements $y' \in \mathbb{R}^{\cup_{i \in [\ell]} C_{2^i}}$
  2: Parameters: $w \in \mathbb{N}$
  3: $S_0 \leftarrow C_1$
  4: for $i = 0, \ldots, \ell$ do
  5: $T_i \leftarrow \text{children}(S_{i-1})$
  6: $S_i \leftarrow$ the set of $\min\{w, |T_i|\}$ coordinates in $T_i$ with maximum values in $y'$
  7: end for
  8: $S \leftarrow \cup_{i \in [\ell]} S_i$ and $\hat{y} \leftarrow y'|_S$
  9: return $\hat{s} \leftarrow \arg\min_{s \geq 0} \|\hat{y} - Ps\|_1$ This "recovered" $\hat{y}$ is close, in the $\ell_1$ metric, to the true value of Ps. Additionally, the outputs are close, in EMD, to s, due in part to the properties of P. Since noise is added to the measurement, the analysis is extended to be robust to noise.

Finally, the privacy parameters $\epsilon_1, \ldots, \epsilon \ell$ are determined to finish the proof of Theorem 3.1.

The additive error bound for $\hat{s}$ is $O_{\epsilon,\lambda}(\sqrt{k})$ (which ultimately gives the $O_{\epsilon,\lambda}(\sqrt{k}/n)$ error bound for the normalized $\hat{a}$). $w = O_\lambda(k)$ was selected so as to have an additive error of $O_\epsilon(\sqrt{w})$. At a high level, each noise $$\frac{1}{2^i} \cdot v_i(t)$$

added to a "queued" term $y_i(t)$ for $t \in T_i$ permeates to an error of the same order. For simplicity, assume for the moment that $|v_i(t)| = O(1/\epsilon_\lambda)$. Now, notice that at level $i < \log \sqrt{w}$, then $|T_i| = C_{2^i} = 2^{2i}$ and thus the total error contribution of this level is $O(2^i/\epsilon_i)$. On the other hand, for a level $i \geq \log \sqrt{w}$, $|T_i| = w$ and the error contribution is $$O\left(\frac{w}{2 \cdot K_t}\right).$$

When $i = \log \sqrt{w} \pm O(1)$, these error terms are $O(\sqrt{w}/\epsilon_i)$ and thus $\epsilon_i$ should be set equal to $\Omega(1)$ to get the desired bound. However, in terms of $|i - \log \sqrt{w}|$, these error contributions become exponentially smaller, i.e., $$O\left(\frac{\sqrt{w}}{2^{|i - \log \sqrt{w}|} \epsilon_i}\right).$$

Thus, the $\epsilon_i$ can be set proportional to $\gamma^{|i - \log \sqrt{w}|}$ for some constant $\gamma > 0.5$. This results in the desired $O_\epsilon(\sqrt{w}) = O_{\epsilon,\lambda}(\sqrt{k})$ bound.

Phase I: $\ell_1$ Recovery. The $\ell_1$ recovery guarantee of $\hat{y}$ is analysed in this section. The recovery algorithm used herein, which is an adaptation of Indyk and Price's k-median clustering, model-based compressive sensing, and sparse recovery for earth mover distance in STOC, pages 627-636, 2011, works well for hidden vectors that follow a certain "tree-like structure", defined formally below.

Definition 3.3. For $i \geq 1$, a grid cell $c' \in C_{2^i}$ is said to be a child of grid cell $c \in C_{2^{i-1}}$ if $c \subseteq c'$. This forms a tree rooted at $[0,1) \times [0,1) \in C_0$ where every internal node has exactly four children. Letting $T_w$ denote the set of all trees such that the number of nodes at each level is at most w.

Let $M_w$ denote the set of $y = [y_0, \ldots, y_\ell]$ where $y_i \in \mathbb{R}_{\geq 0}^{C_{2^i}}$ such that
  1. $\text{supp}(y) \in T$ for some tree $T \in T_w$.
  2. For all $i \in [\ell - 1]$, $p \in C_{2^i}$, the following holds: $y(p) \geq 2 \cdot y(\text{children}(p))$.

Under the above analyses, the $\ell_1$ recovery analysis of Indyk and Price in the no-noise case can be applied to the regime described herein, where the noise shows up as an error:

Lemma 3.2. Let $y^* \in \arg\min_{y \in M_w} \|Ps - y\|_1$ where $\text{supp}(y^*) \subseteq T^*$ for some $T^* \in T_w$; let $T_i^*$ denote $T^* \cap C_{2^i}$ and $V_i = T_i^* \setminus S_i$ for all $i \in [\ell]$. Then, $\hat{y}$ on Line 8 of Reconstruct satisfies $$\|\hat{y} - Ps\|_1 \leq 3\|y^* - Ps\|_1 + O\left(\sum_{i \in [\ell]} \frac{1}{2^i} \|v_i|_{v_i \cup s_i}\|_1\right).$$

Phase II: From $\ell$ 1 to EMD. We now proceed to bound the EMD error.

Lemma 3.3. Let the notation be as in Lemma 3.2. For any $\eta' \in (0,1)$, by setting $w = O(k/(\eta')^2)$, the output $\hat{s}$ of Reconstruct satisfies:

$$\|s - s^*\|_{EMD} \leq \eta' \cdot \min_{k-sparses'} \|s - s'\|_{EMD} + O\left(\sum_{i \in [\ell]} \frac{1}{2^i} \|v_i \mid v_i \cup s_i\|_1\right).$$

Finishing the Proof the privacy parameters can thus be selected so as to complete the proof of Theorem 3.1. Let $w = O(k/(\eta')^2)$ be as in Lemma 3.3 with $\eta' = \lambda/4$, and let $q = \lfloor \log_2 \sqrt{w} \rfloor$. Let $\gamma = 0.8$ be the "decay rate" for the $\varepsilon_i$'s, and let $Z = \Sigma_{i=0}^{\ell} \gamma^{|i-q|} \leq O(1)$ be the normalization factor. Algorithm 1 us then executed with $\varepsilon_i = \gamma^{|i-q|} \cdot \varepsilon/Z$.

Privacy Analysis. One can view the $i^{th}$ iteration of the algorithm as releasing $2^i y'_i = P_i s + v_i$. Since each $p_i$ has $\ell 1$ norm at most one, its sensitivity with respect to $P_i s$ is at most one; thus, Lemma 2.2 implies that the $i^{th}$ iteration is $\varepsilon$-DP. As a result, by basic composition theorem of DP, one can conclude that releasing all of y'$_0$, . . . , y' $\ell$ is $(\varepsilon_0 + \ldots + \varepsilon \ell)$–DP. Since the reconstruction is a post-processing step, the post-processing property of DP ensures that Algorithm 1 is $(\varepsilon_0 + \ldots + \varepsilon \ell)$–DP. Finally, observe that by the definition of the $\varepsilon_i$'s, $\varepsilon_0 + \ldots + \varepsilon \ell = \varepsilon$ as desired.

Utility Analysis. Applying Lemma 3.3, one can conclude that $$\|s - s^*\|_{EMD} \leq \eta' \cdot \min_{k-sparses'} \|s - s'\|_{EMD} + \xi_t,$$

where $\xi = O\left(\Sigma_{i \in [\ell]} \frac{1}{2^i} \|v_i \cup s_i\|_1\right)$.

Recall that each of $V_i$, $S_i$'s is of size at most max $\{w, 2^{2i}\}$ (because of the definition of $M_w$ and the fact that $m_i = |C_{2^i}| = 2^{2i}$), and that each entry of $v_i$ is sampled from Lap($1/\varepsilon_i$). As a result, $$\mathbb{E}[\xi] \leq O\left(\sum_{i \in [\ell]} \frac{1}{2^i} \cdot \max\{w, 2^{2i}\} \cdot \frac{1}{\varepsilon_i}\right) =$$

$$O\left(\sum_{i \in [q]} \frac{2^i}{\gamma^{q-i}\varepsilon}\right) + O\left(\sum_{i \in \{q+1, \ldots, \ell\}} \frac{k}{\lambda^2} \cdot \frac{1}{2^i \gamma^{i-q}\varepsilon}\right) =$$

$$O\left(\frac{2^q}{\varepsilon}\right) + O\left(\frac{k}{\lambda^2} \cdot \frac{1}{2^q} \cdot \frac{1}{\varepsilon}\right) = O\left(\frac{\sqrt{k}}{\lambda \varepsilon}\right),$$

where the last line follows from the choice of $\gamma > 0.5$ and $q = \lfloor \log_2 \sqrt{w} \rfloor$.

Hence, by Markov's inequality, with probability 0.99, $$\|s - s^*\|_{EMD} \leq \eta' \cdot \min_{k-sparses'} \|s - s'\|_{EMD} + 100\mathbb{E}[\xi] =$$

$$\eta' \cdot \min_{k-sparses'} \|s - s'\|_{EMD} + O\left(\frac{\sqrt{k}}{\lambda \varepsilon}\right).$$

Finally, application of Lemma 2.1 concludes the proof.

Experiments

Performance of the example algorithms described herein was assessed on two real-world location datasets.

Implementation Details. Algorithm 1 was implemented with a minor modification: measurement was not performed at the level $i < \lfloor \log \sqrt{w} \rfloor$. In other words, the algorithm was begun directly at the lowest level for which the number of grid cells is at most $\sqrt{w}$. It is possible to adjust the proof to show that, even with this modification, the error remains $O_\varepsilon(\sqrt{k})$. Apart from this, the algorithm was implemented as described above. Note that the linear program at the end of Algorithm 2 can be formulated so that the number of variables is only O(w $\ell$); the reason is that only one variable per cell is needed to be left out at each stage. This allows for efficient solution even when the resolution $\Delta = 2^\ell$ is large.

As for the parameters, the decay rate $\gamma = 1/\sqrt{2}$ was used, which was obtained by minimizing the second error term in the proof of Theorem 3.1 as $\ell \to \infty$. w=20 was used in the experiments, which worked well for the datasets considered.

Datasets. Two datasets available at snap.stanford.edu were used to generate the input distribution for users. The first dataset, called GOWALLA, consists of location check-ins by users of the location based social network Gowalla. Each record consists of, among other things, an anonymized user id together with the latitude (lat) and longitude (lon) of the check-in and a timestamp. This dataset was filtered to consider only check-ins roughly in the continental US for the month of January 2010; this resulted in 196,071 check-ins corresponding to 10,196 users. The second dataset, called BRIGHTKITE, also contains check-ins from a different and now defunct location-based social network Brightkite; each record is similar to GOWALLA. Once again, this dataset was filtered to consider only check-ins in the continental US for the months of November and December 2008; this resulted in 304,608 check-ins corresponding to 10,177 users.

For each of these datasets, the whole area was partitioned into a 300×300 grid. The top 30 cells (in both datasets combined) were then preserved that had have the most check-ins. (Each of the 30 cells was mostly around some city like New York, Austin, etc, and had check-ins from at least 200 unique users). Each cell was then partitioned into $\Delta \times \Delta$ subgrids and each check-in was snapped to one of these subgrids.

Metrics. To evaluate the quality of an output heatmap $\hat{h}$ compared to the true heatmap h, the following commonly used metrics were determined: Similarity, Pearson coefficient, KL-divergence, and EMD. Note that the first two metrics should increase as $\hat{h}$, h are more similar, whereas the latter two should decrease.

Baselines. As a baseline for comparison a recently proposed algorithm was applied, where Laplace noise was added to each subgrid cell of the sum s, any negative cells were zeroed out, and the heatmap was produced from this noisy aggregate. A "thresholding" variant of this baseline was also considered that was more suited to sparse data: only keeping the top t % of the cell values after noising (and zeroing out the rest).

Figure 4:
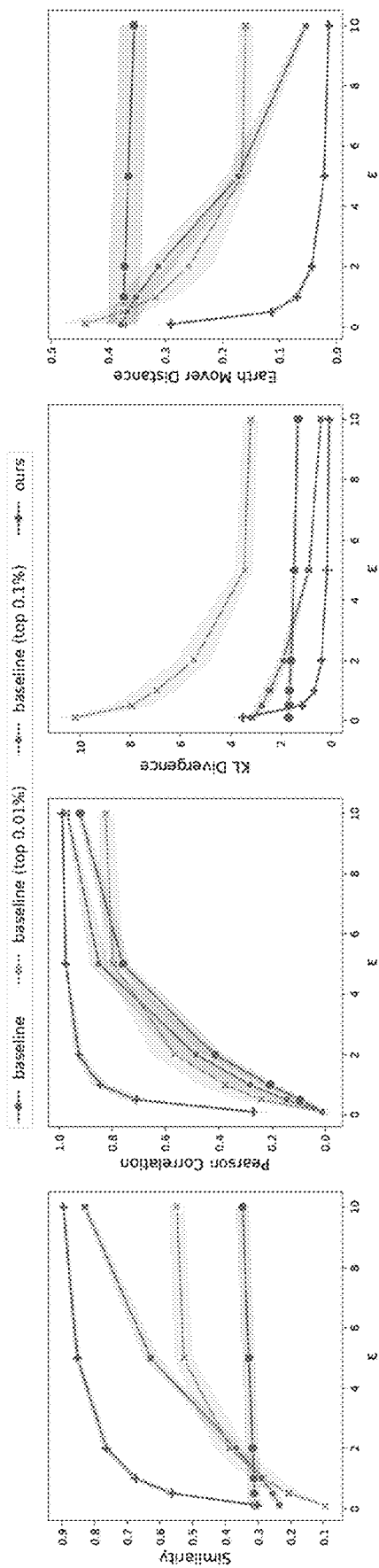
FIG. 4 illustrates experimental results, according to example methods.

In the first set of experiments, $\Delta$ was fixed to 256. For each $\varepsilon \in \{0.1, 0.5, 1, 2, 5, 10\}$, the algorithms were run together with the baseline and its variants on all 30 cells, with 2 trials for each cell. In each trial, a set of 200 users was sampled and used to run all the algorithms; the distance metrics were then computed between the true heatmap and the estimated heatmap. The average of these metrics over the 60 runs is presented in FIG. 4, together with the 95% confidence interval (shading). As can be seen in FIG. 4, the baseline has rather poor performance across all metrics, even for large $\varepsilon = 10$. Several values oft were evaluated for the thresholding variant, yielding a significant improvement. Despite this, the algorithm described herein consistently out-performed the alternatives across all metrics. These improvements are especially significant when E is not too large or too small (e.g., $0.2 \leq \varepsilon \leq 5$).

In the second set of experiments, the effect of varying the number n of users was studied. By fixing a single cell (that contains>500 users) and $\varepsilon$, n was swept across {50, 100, 200, 300, 400, 500} users. For each value of n, 10 trials were run and their results averaged. As predicted by theory, it was observes that the algorithms described herein and the original baseline performed better as n increased. However, the behavior of the thresholding variants of the baseline method were less predictable, and sometimes the performance degraded with a larger number of users. It seems plausible that a larger number of users cause an increase in the sparsity, which after some point makes the simple thresholding approach unsuited for the data.

Another set of experiments were also run a single cell and E were fixed, and the resolution $\Delta$ was varied across {64, 128, 256}. In agreement with theory, the algorithm described herein had a utility that remained nearly constant for the entire range of $\Delta$. On the other hand, the original baseline method suffered across all metrics as $\Delta$ increased. The effects on the thresholding variants of the baseline method were more subtle; they occasionally improved as $\Delta$ increased, which might be attributed to the fact that when $\Delta$ is small, thresholding can zero out too many subgrid cells.

Figure 5:
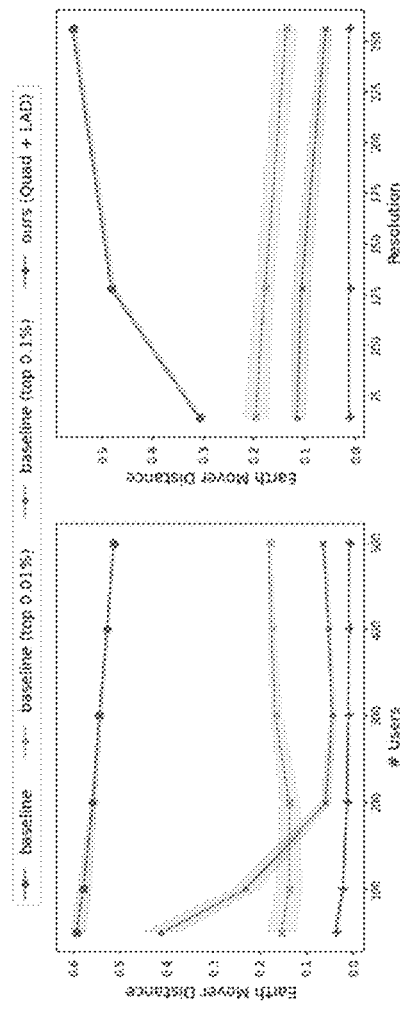
FIG. 5 illustrates experimental results, according to example methods.
Figure 6:
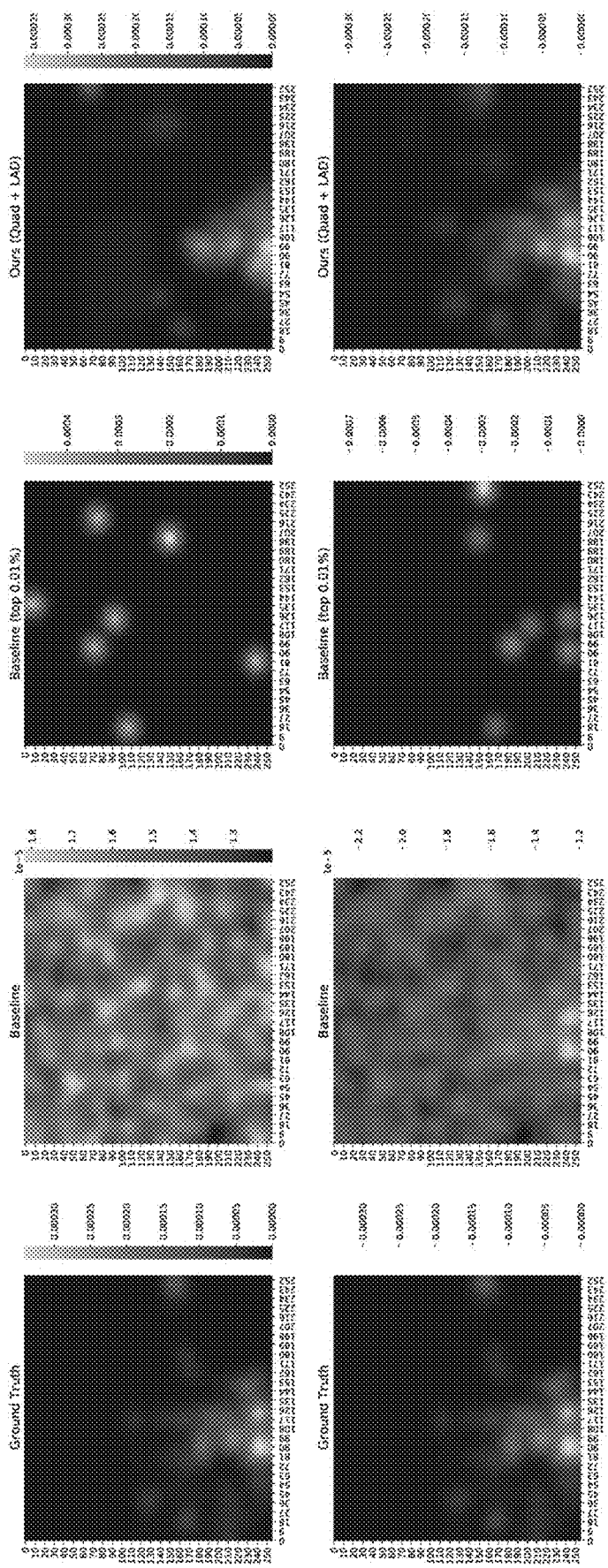
FIG. 6 illustrates experimental results, according to example methods.

FIG. 5 presents results from the latter two sets of experiments under the EMD metric when $\varepsilon=10$. Examples of the heatmaps resulting from the experiments according to each approach are depicted in FIG. 6 ($\varepsilon=1$ (top) and $\varepsilon=5$ (bottom)). The algorithms from left to right in FIG. 6 are: original heatmap (no privacy), baseline method, baseline method with top 0.01% thresholding, and the method described herein.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A computer-implemented method comprising:
receiving an input distribution that is an average of a number of individual distributions, each individual distribution representing data from a respective different entity, wherein the input distribution is a two-dimensional distribution;
using a multi-scale spatial transform, transforming the input distribution into a multi-scale representation that includes two or more representations of the input distribution at respective different spatial scales;
adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales; and
based on the anonymized multi-scale representation, reconstructing an output distribution such that the output distribution, when transformed using the multi-scale spatial transform, results in an approximation of the anonymized multi-scale representation to generate a heatmap ensuring the output distribution preserves the privacy of the input distribution.

2. The computer-implemented method of claim 1, further comprising:
receiving the individual distributions, wherein receiving the input distribution comprises determining a mean of the individual distributions.

3. The computer-implemented method of claim 1, wherein the individual distributions are indicative of gaze directions.

4. The computer-implemented method of claim 1, wherein the individual distributions are indicative of cursor locations.

5. The computer-implemented method of claim 1, wherein the multi-scale spatial transform is a pyramidal transform.

6. The computer-implemented method of claim 1, wherein adding noise to the multi-scale representation to generate the anonymized multi-scale representation comprises: adding Laplacian-distributed noise to each of the two or more representations of the input distribution at respective different spatial scales such that the variance of the Laplacian-distributed noise varies according to the spatial scales of the two or more representations of the input distribution at respective different spatial scales.

7. The computer-implemented method of claim 6, wherein the variance of the Laplacian-distributed noise decreases from one spatial scale to the next according to a decay parameter, and wherein the decay parameter has a value between 0.5 and 1.0.

8. The computer-implemented method of claim 1, wherein reconstructing the output distribution such that the output distribution, when transformed using the multi-scale spatial transform, results in an approximation of the anonymized multi-scale representation comprises: determining the output distribution such that the output distribution, when transformed using the multi-scale spatial transform, results in a reduced difference between the anonymized multi-scale representation and the output distribution when transformed using the multi-scale spatial transform.

9. The computer-implemented method of claim 8, wherein the reduced difference between the anonymized multi-scale representation and the output distribution when transformed using the multi-scale spatial transform is a reduced $\ell 1$ distance between the anonymized multi-scale representation and the output distribution when transformed using the multi-scale spatial transform.

10. The computer-implemented method of claim 8, further comprising:
prior to reconstructing the output distribution, sparsifying the anonymized multi-scale representation such that no more than a specified number of elements of any of the two or more representations of the input distribution at respective different spatial scales are non-zero.

11. The computer-implemented method of claim 1, further comprising:
generating a heat map based on the output distribution.

12. A computer-implemented method comprising:
receiving an input distribution that is an average of a number of individual distributions, each individual distribution representing data from a respective different entity, wherein the input distribution is a two-dimensional distribution;
using a multi-scale spatial transform, transforming the input distribution into a multi-scale representation that includes two or more representations of the input distribution at respective different spatial scales;
adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales;
sparsifying the anonymized multi-scale representation such that no more than a specified number of elements of any of the two or more representations of the input distribution at respective different spatial scales are non-zero; and
based on the sparsified anonymized multi-scale representation, reconstructing an output distribution such that the output distribution, when transformed using the multi-scale spatial transform, results in an approximation of the sparsified anonymized multi-scale representation to generate a heatmap ensuring the output distribution preserves the privacy of the input distribution.

13. The computer-implemented method of claim 12, further comprising:
receiving the individual distributions, wherein receiving the input distribution comprises determining a mean of the individual distributions.

14. The computer-implemented method of claim 12, wherein adding noise to the multi-scale representation to generate the anonymized multi-scale representation comprises: adding Laplacian-distributed noise to each of the two or more representations of the input distribution at respective different spatial scales such that the variance of the Laplacian-distributed noise varies according to the spatial scales of the two or more representations of the input distribution at respective different spatial scales.

15. The computer-implemented method of claim 14, wherein the variance of the Laplacian-distributed noise decreases from one spatial scale to the next according to a decay parameter, and wherein the decay parameter has a value between 0.5 and 1.0.

16. The computer-implemented method of claim 12, wherein reconstructing the output distribution such that the output distribution, when transformed using the multi-scale spatial transform, results in an approximation of the anonymized multi-scale representation comprises: determining the output distribution such that the output distribution, when transformed using the multi-scale spatial transform, results in a reduced difference between the anonymized multi-scale representation and the output distribution when transformed using the multi-scale spatial transform.

17. The computer-implemented method of claim 16, wherein the reduced difference between the anonymized multi-scale representation and the output distribution when transformed using the multi-scale spatial transform is a reduced $\ell 1$ distance between the anonymized multi-scale representation and the output distribution when transformed using the multi-scale spatial transform.

18. A computing device comprising:
one or more processors, wherein the one or more processors are configured to perform operations comprising:
receiving an input distribution that is an average of a number of individual distributions, each individual distribution representing data from a respective different entity, wherein the input distribution is a two-dimensional distribution;
using a multi-scale spatial transform, transforming the input distribution into a multi-scale representation that includes two or more representations of the input distribution at respective different spatial scales;
adding noise to the multi-scale representation to generate an anonymized multi-scale representation, wherein adding noise to the multi-scale representation to generate the anonymized multi-scale representation comprises adding a different amount of noise to each of the two or more representations of the input distribution at respective different spatial scales; and
based on the anonymized multi-scale representation, reconstructing an output distribution such that the output distribution, when transformed using the multi-scale spatial transform, results in an approximation of the anonymized multi-scale representation to generate a heatmap ensuring the output distribution preserves the privacy of the input distribution.

19. The computing device of claim 18, wherein the operations further comprise:
sparsifying the anonymized multi-scale representation such that no more than a specified number of elements of any of the two or more representations of the input distribution at respective different spatial scales are non-zero, wherein reconstructing the output distribution comprises: reconstructing the output distribution based on the sparsified anonymized multi-scale representation such that the output distribution, when transformed using the multi-scale spatial transform, results in an approximation of the sparsified anonymized multi-scale representation.

* * * * *